US011461324B2

(12) United States Patent
Fender et al.

(10) Patent No.: US 11,461,324 B2
(45) Date of Patent: Oct. 4, 2022

(54) FIRST FUTAMURA PROJECTION IN THE CONTEXT OF SQL EXPRESSION EVALUATION

(71) Applicant: Oracle International Corporation, Redwood Shores, CA (US)

(72) Inventors: Pit Fender, Union City, CA (US); Alexander Ulrich, Freiburg (DE); Laurent Daynes, Saint Ismier (FR); Matthias Brantner, Sunnyvale, CA (US); Bastian Hossbach, Thalwil (CH); Benjamin Schlegel, Merced, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 233 days.

(21) Appl. No.: 16/555,974

(22) Filed: Aug. 29, 2019

(65) Prior Publication Data

US 2021/0064619 A1 Mar. 4, 2021

(51) Int. Cl.
*G06F 16/24* (2019.01)
*G06F 16/2453* (2019.01)
*G06F 16/2455* (2019.01)
*G06F 8/41* (2018.01)

(52) U.S. Cl.
CPC ........ *G06F 16/24542* (2019.01); *G06F 8/427* (2013.01); *G06F 8/4443* (2013.01); *G06F 16/2455* (2019.01)

(58) Field of Classification Search
CPC .................. G06F 16/24542; G06F 16/2455
See application file for complete search history.

(56) References Cited

U.S. PATENT DOCUMENTS

| 4,894,771 A | 1/1990 | Kunii |
| 4,930,071 A | 5/1990 | Tou et al. |
| 5,893,104 A | 4/1999 | Srinivasan |

(Continued)

OTHER PUBLICATIONS

Fender, U.S. Appl. No. 16/556,847, filed Aug. 30, 2019, Advisory Action, dated Oct. 7, 2021.

(Continued)

*Primary Examiner* — Eliyah S. Harper
(74) *Attorney, Agent, or Firm* — Hickman Becker Bingham Ledesma LLP; Brian N. Miller

(57) ABSTRACT

The present invention relates to execution optimization of database queries. Herein are techniques for optimal execution based on query interpretation by translation to a domain specific language (DSL), with optimizations such as partial evaluation, abstract syntax tree (AST) rewriting, just in time (JIT) compilation, dynamic profiling, speculative logic, and Futamura projection. In an embodiment, a database management system (DBMS) that is hosted on a computer generates a query tree that represents a database query that contains an expression that is represented by a subtree of the query tree. The DBMS generates a sequence of DSL instructions that represents the subtree. The sequence of DSL instructions is executed to evaluate the expression during execution of the database query. In an embodiment, an AST is generated from the sequence of DSL instructions. In an embodiment, the DSL AST is optimally rewritten based on a runtime feedback loop that includes dynamic profiling information.

20 Claims, 10 Drawing Sheets

(56) References Cited

U.S. PATENT DOCUMENTS

| | | | |
|---|---|---|---|
| 5,987,463 | A | 11/1999 | Draaijer et al. |
| 5,995,974 | A | 11/1999 | Anton |
| 6,360,228 | B1 | 3/2002 | Sundara |
| 6,725,213 | B1 | 4/2004 | Chiocca et al. |
| 7,308,460 | B2 | 12/2007 | Venkatesh |
| 9,135,293 | B1 | 9/2015 | Kienzle et al. |
| 10,061,872 | B1 | 8/2018 | Raman et al. |
| 10,983,815 | B1 | 4/2021 | Barry et al. |
| 2005/0119988 | A1 | 6/2005 | Buch et al. |
| 2007/0038662 | A1 | 2/2007 | Bendel et al. |
| 2007/0220020 | A1 | 9/2007 | Goto |
| 2008/0270455 | A1 | 10/2008 | Bendel et al. |
| 2013/0054649 | A1 | 2/2013 | Potapov et al. |
| 2013/0263116 | A1 | 10/2013 | Haupt et al. |
| 2014/0067836 | A1* | 3/2014 | Holmes ............... G06Q 10/0633 707/756 |
| 2014/0181073 | A1* | 6/2014 | Wong ................ G06F 16/24526 707/714 |
| 2017/0161325 | A1 | 6/2017 | Rastogi et al. |
| 2018/0136959 | A1 | 5/2018 | Vyas |
| 2019/0065552 | A1 | 2/2019 | Brantner et al. |
| 2019/0361916 | A1* | 11/2019 | Weaver ............... G06F 21/6227 |
| 2020/0210157 | A1 | 7/2020 | Munaganuru |
| 2021/0064588 | A1 | 3/2021 | Fender |

OTHER PUBLICATIONS

Fender, U.S. Appl. No. 16/556,847, filed Aug. 30, 2019, Final Rejection, dated Aug. 30, 2021.

Fender, U.S. Appl. No. 16/556,847, filed Aug. 30, 2019, Office Action, dated Apr. 15, 2021.

Fender, U.S. Appl. No. 16/556,760, filed Aug. 30, 2019, Non-Final Rejection, dated Oct. 1, 2021.

Yu et al., "Query Compilation in PostgreSQL by Specialization of the DBMS Source Code", Programming and Computer Software Consultants Bureau, vol. 43, No. 6, dated Dec. 16, 2017, pp. 353-365.

Sipek M. et al., "Exploring Aspects of Polyglot High-Performance Virtual Machine GraalVM", dated 2019 42nd International Convention on Information Technology, dated May 20, 2019, pp. 1671-1676.

Wurthinger et al., "Practical Partial Evaluation for High-Performance Dynamic Language Runtimes", PLDI'17, Jun. 18-23, 2017, Barcelona, Spain, 15 pages.

Wimmer, Christian, Oracle, "One VM to Rule Them All", VM Research Group, Oracle Labs, dated 2016, 130 pages.

Wanderman-Milne, Skye, "Building a Modern Database Using LLVM", dated Nov. 6, 2013, 27 pages.

Steuwer et al., "Lift: A Functional Data-Parallel IR for High-Performance GPU Code Generation", University of Edinburgh, United Kingdom, IEEE, dated 2017, 13 pages.

Marr, Stefan, "Tracing vs. Partial Evaluation", OOPSLA'15 Oct. 25-30, 2015, Pittsburgh, PA, USA, 20 pages.

Hagedon et al., "High Performance Stencil Code Generation with Lift", CGO'18, Feb. 24-28, 2018, Vienna, Austria, 14 pages.

Github, "Writing a Language in Truffle. Part 1: A Simple, Slow Interpreter", dated Oct. 13, 2014, 17 pages.

Franklin, Christopher, "A Guide to Java 9 Modularity", https://www.baeldung.com/java-9-modularity, dated May 12, 2019, 14 pages.

Fehrenbach, Stefan, "Just-in-time Compilation for Generalized Parsing", dated Sep. 1, 2014, 41 pages.

\* cited by examiner

FIRST FUTAMURA PROJECTION IN THE CONTEXT OF SQL EXPRESSION EVALUATION

FIELD OF THE INVENTION

The present invention relates to execution optimization of database queries. Herein are techniques for optimal execution based on query interpretation by translation to a domain specific language (DSL), with optimizations such as partial evaluation, abstract syntax tree (AST) rewriting, just in time (JIT) compilation, dynamic profiling, speculative logic, and Futamura projection.

BACKGROUND

Recent advances in research and industry generate low level virtual machine (LLVM) bitcode for a given query plan. The LLVM bitcode is compiled by the LLVM compiler (LLC) into machine code by going through a code generation step and by compiling the generated code at compile time of the query.

The code generation and LLVM compilation approach has major limitations. The generated code is statically compiled, meaning only information available at compile time has been considered. That has notable limitations, as current runtime information cannot be taken into account. There are several reasons why current research and industry solutions cannot exploit dynamic profiling information.

There is no profiling infrastructure build in into the SQL expression operands. Even if there were, this would have major runtime overhead.

A priori knowledge at compile-time is not available either, since a whole query plan would need to be evaluated, including all intermediate results.

Speculative logic is unsupported.

DETAILED DESCRIPTION

Figure 1:
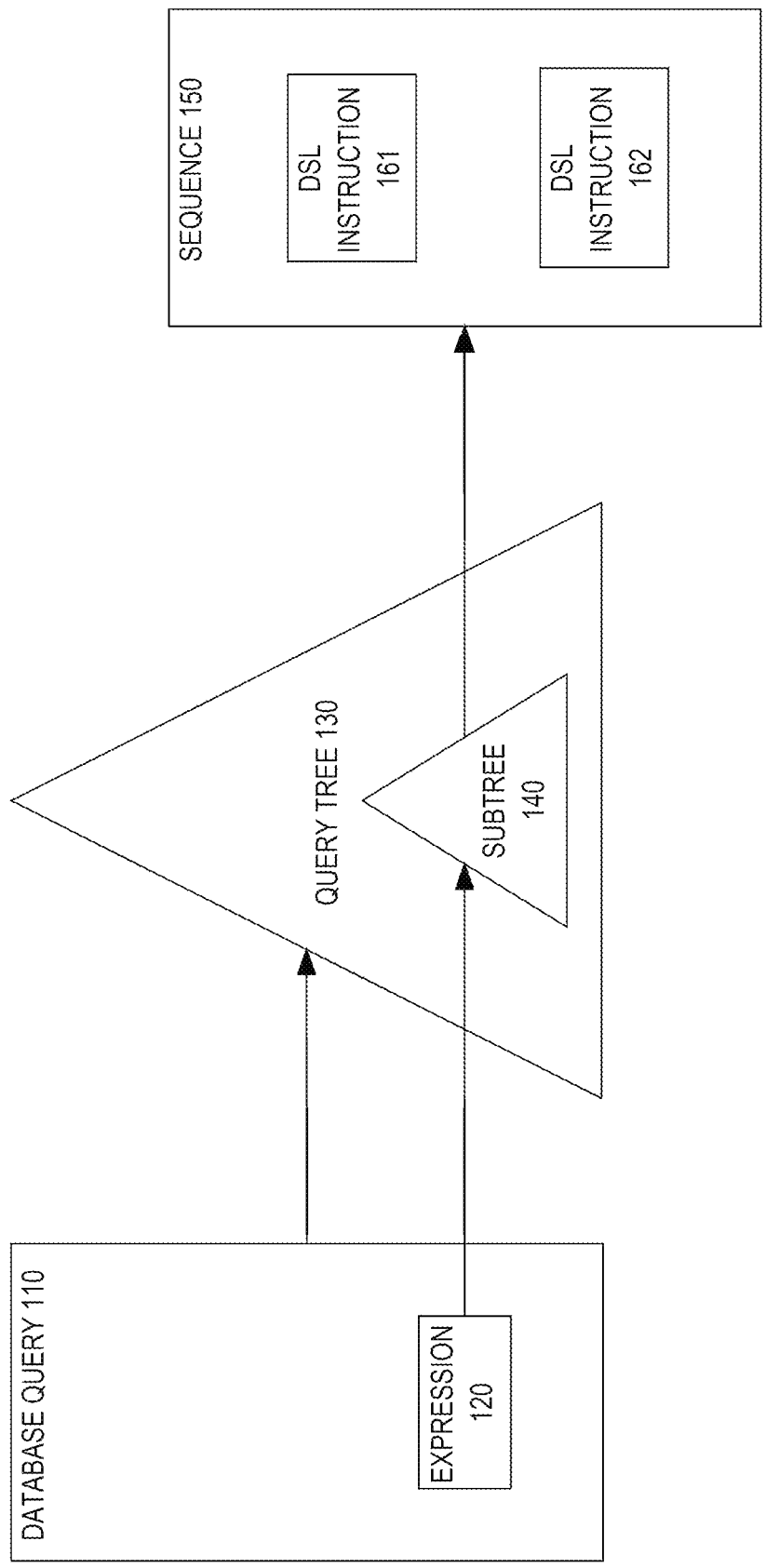
FIG. 1 is a block diagram that depicts an example computer that optimizes execution of a database query based on interpretation by translation to a domain specific language (DSL), with optimizations such as partial evaluation and just in time (JIT) compilation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein depart from the static techniques of a low level virtual machine (LLVM), especially by adding a runtime feedback loop that is needed to achieve dynamic optimization. Through the usage of the Truffle language framework and the Graal just in-time (JIT) compiler, runtime information can be considered, and more optimized code can be produced. Hereby a Truffle language is implemented through an abstract syntax tree (AST) interpreter. More specifically, domain specific language (DSL) elements are mapped to syntax nodes implemented in accordance with the Truffle framework. Each syntax node has an execute method which implements the logic of the language element. To execute the language program, the Truffle framework invokes a language parser. The output of the Truffle language parser is a AST. For each parsed language element the parser instantiates the corresponding syntax node and links all AST nodes to instantiate the AST. The result of the parsing step is an instantiated AST. The Truffle language program is then executed by interpretation, which means invoking the execute method of the root AST node. The execute method of the root node then invokes the execute methods of the syntax nodes that are attached as the root node's children. This process recurses for the children of the nodes in a top-down depth-first manner.

During the interpretation process run-time information is collected. Truffle's strong suit is the ability to leverage the profiling information to trigger self-optimization techniques. Some of those key optimization techniques include: type specializations, rewriting of indirect function calls, polymorphic inline caches, branch elimination and speculative function inlining. If these speculative assumptions turn out to be wrong, the specialized AST can be reverted to a more generic version that provides functionality for more generic cases if available and compiled already, or deoptimization is triggered.

When the execution count of a syntax node reaches a predefined threshold, Truffle triggers partial evaluation by a call to the Graal compiler. By compiling the program represented by the AST together with its interpreter a first Futamura projection is applied. The output is highly optimized machine code with deoptimization points. Those points are implemented as check points where deoptimization is triggered when the speculative assumptions do not hold anymore. Deoptimization means that control is transferred back from the compiled code to the AST interpreter, where specialized nodes are then reverted to a more generic version.

Instead of interpreting SQL expressions or generating and statically compiling code per LLVM, SQL expressions can be evaluated by leveraging the Truffle framework. The SQL standard defines a grammar for the SQL language, including a grammar for SQL expressions. Hence SQL expressions can be described through a language. Consequently SQL expressions can be implemented as a Truffle Language.

By implementing SQL expression as a Truffle language, the benefits of the Truffle framework and the Graal compiler can be leveraged. An example implementation may have the following techniques:

The overall idea of recognizing SQL expressions as a language that can be "truffelized". The new language is multilingual engine stub language (MSL) as presented later herein;

A MSL generator: an algorithm that given an expression tree, generates MSL code;

A MSL parser: an algorithm that parses MSL code and instantiates the corresponding MSL Truffle syntax nodes;

An architecture of how to embed the Truffle and Graal compiler framework into a database management system (DBMS). A new SQL expression node is introduced that is responsible for storing MSL code at the query compilation phase, and executing MSL code at the query execution phase. The new SQL expression node will replace the root of the corresponding SQL expression tree.

In an embodiment, a DBMS that is hosted on a computer generates a query tree that represents a database query that contains an expression that is represented by a subtree of the query tree. The DBMS generates a sequence of domain specific language (DSL) instructions that represents the subtree. The sequence of DSL instructions is executed to evaluate the expression during execution of the database query. In an embodiment, an abstract syntax tree (AST) is generated from the sequence of DSL instructions. In an embodiment, the DSL AST is optimally rewritten based on a runtime feedback loop that includes dynamic profiling information.

Unlike a general purpose programing language, a DSL typically has a narrow (i.e. special) purpose that is more or less limited to a particular subject matter domain, such as a particular technological concern. Because a DSL has a narrower scope than a general purpose language, the DSL's grammar may be much smaller (i.e. simpler). Thus, DSL tooling such as a tokenizer, parser, semantic analyzer, code generator, optimizer, runtime profiler, and/or interpreter may be greatly streamlined compared to general purpose tooling.

Such lean tools should themselves have a smaller codebase, with simpler flows of control and data. With optimization techniques herein, such lean tools, as optimizable artifacts themselves, are made substantially leaner, such as when a type inference obviates some of a DSL interpreter's own logic. Obviated interpreter logic is fit for dead code elimination, which results in a smaller and faster DSL interpreter, such as by Futamura projection as presented herein.

Futamura projection is a way to shrink and accelerate an interpreter's codebase in memory during interpretation (i.e. interpreter operation). As explained later herein, the lean and optimized tooling, such as a DSL interpreter, especially by Futamura projection, can save computer resources such as time and scratch space. An optimized DSL interpreter can become so small that each query may have its own instance of a DSL interpreter that is independently optimized just for that query. With amortization of optimization overhead (i.e. latency) across database records, such as in a database table or intermediate result set, an optimizable DSL interpreter may substantially accelerate an ad hoc query. Thus, an optimizable DSL interpreter may be readily embedded into a query engine of a DBMS according to techniques herein.

1.0 Example Computer

FIG. 1 is a block diagram that depicts an example computer 100, in an embodiment. Computer 100 optimizes execution of database query 110 based on interpretation by translation to a domain specific language (DSL), with optimizations such as partial evaluation and just in time (JIT) compilation. More optimizations are presented later herein.

Computer 100 may be at least one computer such as a rack server such as a blade, a personal computer, a mainframe, a virtual computer, or other computing device. When computer 100 has multiple computers, the computers are interconnected by a communication network.

Although not shown, computer 100 may host a database management system (DBMS) that receives and executes database query 110, which may contain relational algebra, such as according to a data manipulation language (DML) such as structured query language (SQL). For example, the DBMS may be a relational DBMS (RDBMS) that contains database(s) that contain relational tables. Instead, the DBMS may contain other datastore(s) such as a column store, a tuple store such as a resource description framework (RDF) triple store, a NoSQL database, and/or a Hadoop filesystem (HDFS) such as with Hadoop and/or Apache Hive.

Database query 110 may be an ad hoc query or other DML statement, such as a prepared (i.e. batched) statement and/or a statement to create, read, update, and/or delete (CRUD). The DBMS may receive and parse database query 110 to create query tree 130 that represents database query 110 in a format that can be executed (e.g. interpreted) by a database server of the DBMS to apply relational algebra.

Query tree 130 contains operational nodes as tree nodes (not shown) arranged as a logical tree data structure, such as created when a query parser (not shown) parses database query 110, such as before query planning. Per other figure(s) herein, the DBMS may contain a query engine that contains a pipeline of stages that generate a sequence of increasingly faster representations of database query 110. Some of the generative stages of that pipeline may include, in the following pipeline ordering: query tree 130, domain specific language (DSL) instruction sequence 150, and an abstract syntax tree (AST) for DSL instruction sequence 150 as shown in other figure(s).

Thus, a DBMS may generate both a query tree and a DSL AST. Thus, two logical trees may be generated, each of which represents some or all of database query 110.

In an embodiment, query tree 130 is also an AST, but for a different language, such as SQL, than the DSL AST. In any case, both of query tree 130 and the DSL AST contain tree nodes. Herein, a query node is any tree node in the query tree. A syntax node is any tree node in the DSL AST. DSL and AST are presented later herein. In an embodiment, query tree 130 may be a query plan.

Both kinds of trees may hierarchically arrange their tree nodes. A tree node may have one other tree node as its parent node, which may have more child nodes. A tree may have a subtree, such as 140, of nodes that indirectly share a same ancestor node. A tree node without child nodes is a leaf node.

Each query node can execute part of database query 110, such that operation of all nodes in query tree 130 fulfils database query 110. Database query 110 contains expression 120, which may be a logical and/or arithmetic expression, such as a compound expression having many terms and operators, such as in a clause of database query 110, such as for filtration, such as an SQL WHERE clause. Query subtree 140 represents and is generated from expression 120.

In an embodiment, the DBMS can directly execute some or all query nodes to fulfil database query 110. In an embodiment, the DBMS instead or additionally generates sequence(s), such as 150, of DSL instructions such as 161-162, such as imperative statements, such as lines of DSL source logic text. For example, DSL sequence 150 may be a DSL script, such as stored in a file or in random access memory (RAM). Multilingual engine stub language (MSL) is an example implementation, of a particular DSL, based on several innovative techniques and mechanisms as presented later herein.

One DSL sequence may represent and be generated from whole query tree 130 or, for partial evaluation, DSL sequence(s) may represent and be generated from respective subtree(s) or individual query nodes of query tree 130. Thus, DSL sequence 150 represents both of subtree 140 and expression 120, and is directly generated from subtree 140 and thus indirectly generated from expression 120. Thus, DBMS may execute either subtree 130 or DSL sequence 150 to actually apply expression 120.

For example, a (e.g. eager) optimizer such as a query planner may more or less immediately generate DSL sequence 150, and switch to using DSL sequence 150 as soon as it is generated. In an embodiment, an optimizer may wait for generation of DSL sequence 150 to complete. A lazy optimizer may decide whether to continue operating subtree 130 or instead (e.g. pause to) generate DSL sequence 150, such as even after query results (not shown) have begun generating.

DSL sequence 130 may eventually, or even initially, run faster than subtree 130, such as according to progressive and/or speculative optimizations presented later herein. Thus, even though generating DSL sequence 150 imposes overhead such as latency, such costs may be amortized across e.g. millions of rows of a database table. For example, a DSL sequence for query tree 130 or subtree 140 may be cached, just as query tree 130 or subtree 140 may be cached.

As presented later herein there may be additional levels of code generation, such as compilation of DSL sequence 150 to bytecode and/or machine code, and such further generated code may also be cached, speculative, and/or partially evaluated, and those optimizations may be synergistic as discussed later herein. For example, directly executable machine code may already be generated for subtree 140. Whereas, another subtree of query tree 130 may still only have bytecode for interpretation.

In an embodiment, the DBMS may maintain statistical metadata such as table cardinality (i.e. row numerosity) that may facilitate costing to predict whether or not an amortization can justify a particular optimization. In an embodiment, a database table column may be run length encoded, and costing is based on run length(s).

2.0 Example DSL Generation Process

Figure 2:
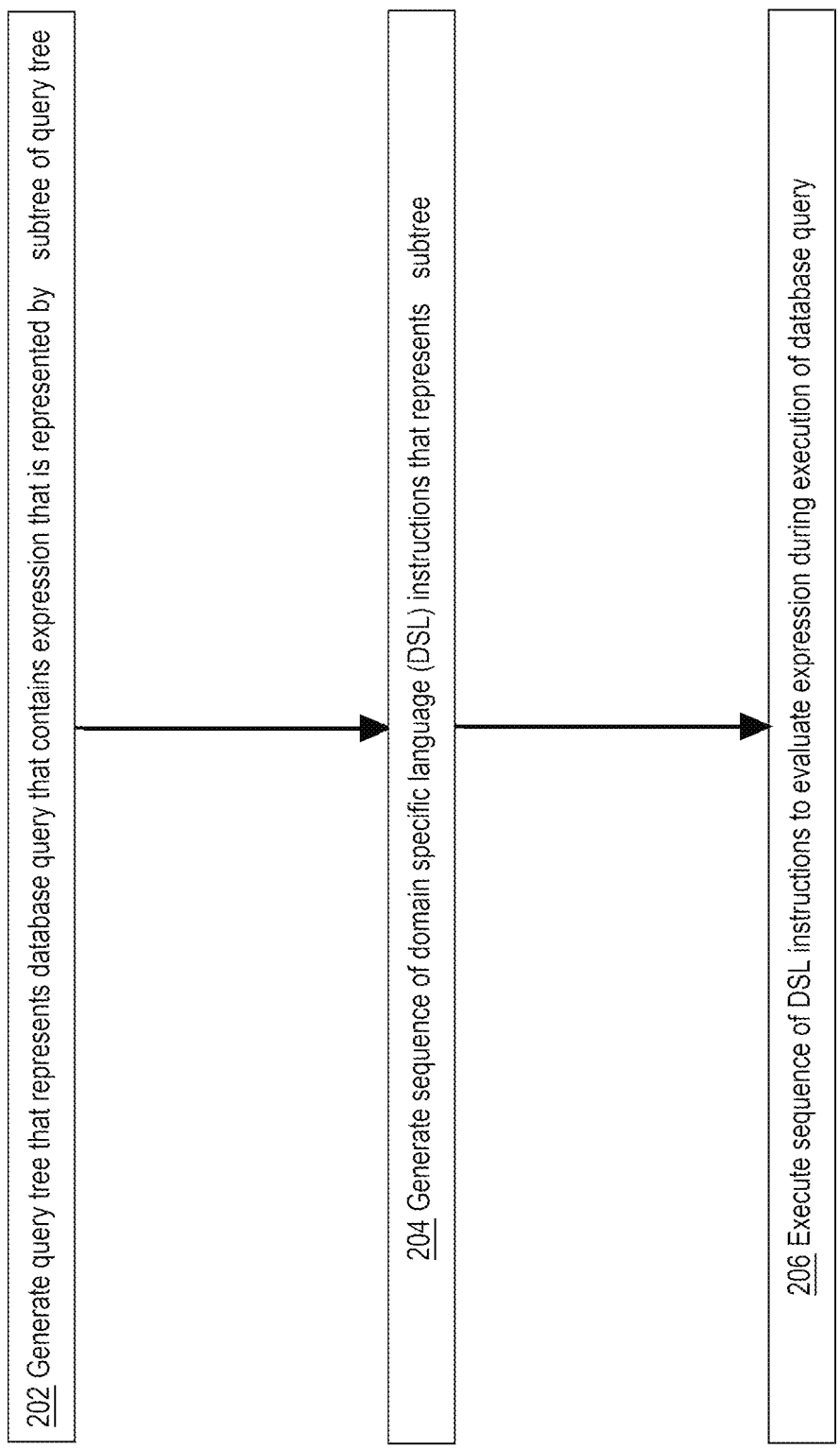
FIG. 2 is a flow diagram that depicts an example computer process for optimizing execution of a database query based on interpretation by translation to a DSL, with optimizations such as partial evaluation and JIT compilation.

FIG. 2 is a flow diagram that depicts computer 100 optimizing execution of database query 110 based on interpretation by translation to a DSL, with optimizations such as partial evaluation and JIT compilation, in an embodiment. FIG. 2 is discussed with reference to FIG. 1.

Step 202 generates query tree 130 that represents database query 110 that contains expression 120 that is represented by subtree 140. For example, the DBMS of computer 100 receives (e.g. ad hoc) database query 110, such as a text statement, such as on a network socket according to open database connectivity (ODBC). The DBMS contains a parser that tokenizes and parses database query 110 to generate query tree 130 and its query nodes.

Step 204 generates DSL instruction sequence 150 that directly represents query subtree 140 and indirectly represents query expression 120. For example such as according to a visitor software design pattern, the DBMS may traverse the query nodes of subtree 140 to generate DSL instructions 161-162. For example, each of DSL instructions 161-162 may be generated from a respective query node of subtree 140. In some cases, multiple (e.g. contiguous) DSL instructions may be generated for a same query node. A working example implementation of DSL instruction sequence 150 for query expression 120 is presented later herein.

Step 206 executes DSL instruction sequence 150 to evaluate query expression 120 during execution of database query 110. For example, the DBMS may compile DSL instruction sequence 150 into bytecode or machine code for execution in step 206, such as discussed later herein.

3.0 DSL Embedding

Figure 3:
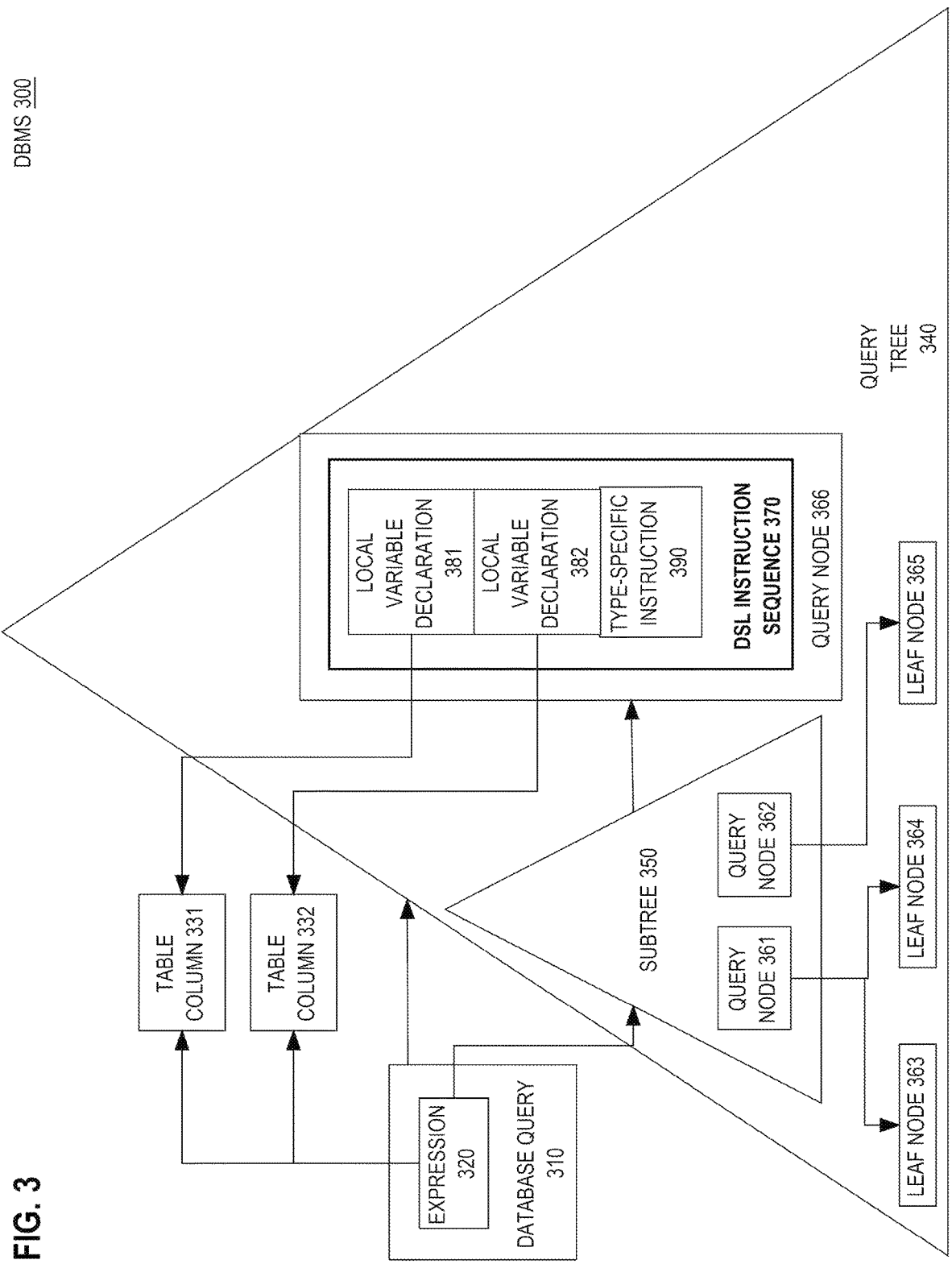
FIG. 3 is a block diagram that depicts an example database management system (DBMS) that, in a query tree, replaces a subtree with a synthetic query node that has a partial evaluation of the subtree.

FIG. 3 is a block diagram that depicts an example DBMS 300, in an embodiment. In query tree 340, DBMS 300 replaces subtree 350 with synthetic query node 366 that has a partial evaluation of subtree 350. DBMS 300 may be an implementation of the DBMS (not shown) hosted by computer 100.

DBMS 300 generates query tree 340 from received database query 310 that contains DML expression 320, from which subtree 350 is generated. Repeated interpretation of subtree 350 may be slow and may be immediately or eventually ripe for partial evaluation. For example, lazy thresholds are discussed later herein. DBMS 300 generates DSL instruction sequence 370 from subtree 350. Retrofitting DSL instruction sequence 370 into query tree 340 may occur as follows.

Synthetic tree node 366 may be generated as an adapter (e.g. container) for DSL instruction sequence 370. Although subtree 350 may contain many query nodes, such as 361-362, subtree 350 has one query node (not shown) as its root. In query tree 340, DBMS 300 replaces subtree 350 with single query node 366. Thus, execution of query tree 340 will cause execution of DSL instruction sequence 370 instead of subtree 350.

In an embodiment, leaf nodes of subtree 350, such as 363-365, are specially handled. Unlike query nodes 361-362 that may be discarded or cached after removal from query tree 340, leaf nodes 363-365 are instead reparented to become children of synthetic tree node 366. In an embodiment, leaf nodes 363-365 may simultaneously be children of query nodes 361 or 362 and 366.

Database query 310 may access table columns 331-332, such as in a CRUD expression, such as for filtration. Within DSL instruction sequence 370, a local variable declaration, such as 381-382 may be respectively generated for each of table columns 331-332. Thus, semantics of local variables may be exploited, as defined by the particular DSL, and may include logical algebra, datatypes, and matters of lexical scope, such as visibility and longevity.

Datatypes may be more or less pervasively imposed upon data, such as with table columns, terms of DML expression 320, and/or local variables. Datatypes invite (e.g. speculative) optimization. For example, some datatypes consume less storage, execute with fewer instructions, and/or exploit special hardware for acceleration such as registers, vector hardware, and/or coprocessors. Thus, DSL instruction sequence 370 may contain type-specific instructions, such as 390, that might malfunction if applied to data of a wrong (e.g. unexpected) datatype, as discussed later herein.

4.0 Example DSL Embedding Process

Figure 4:
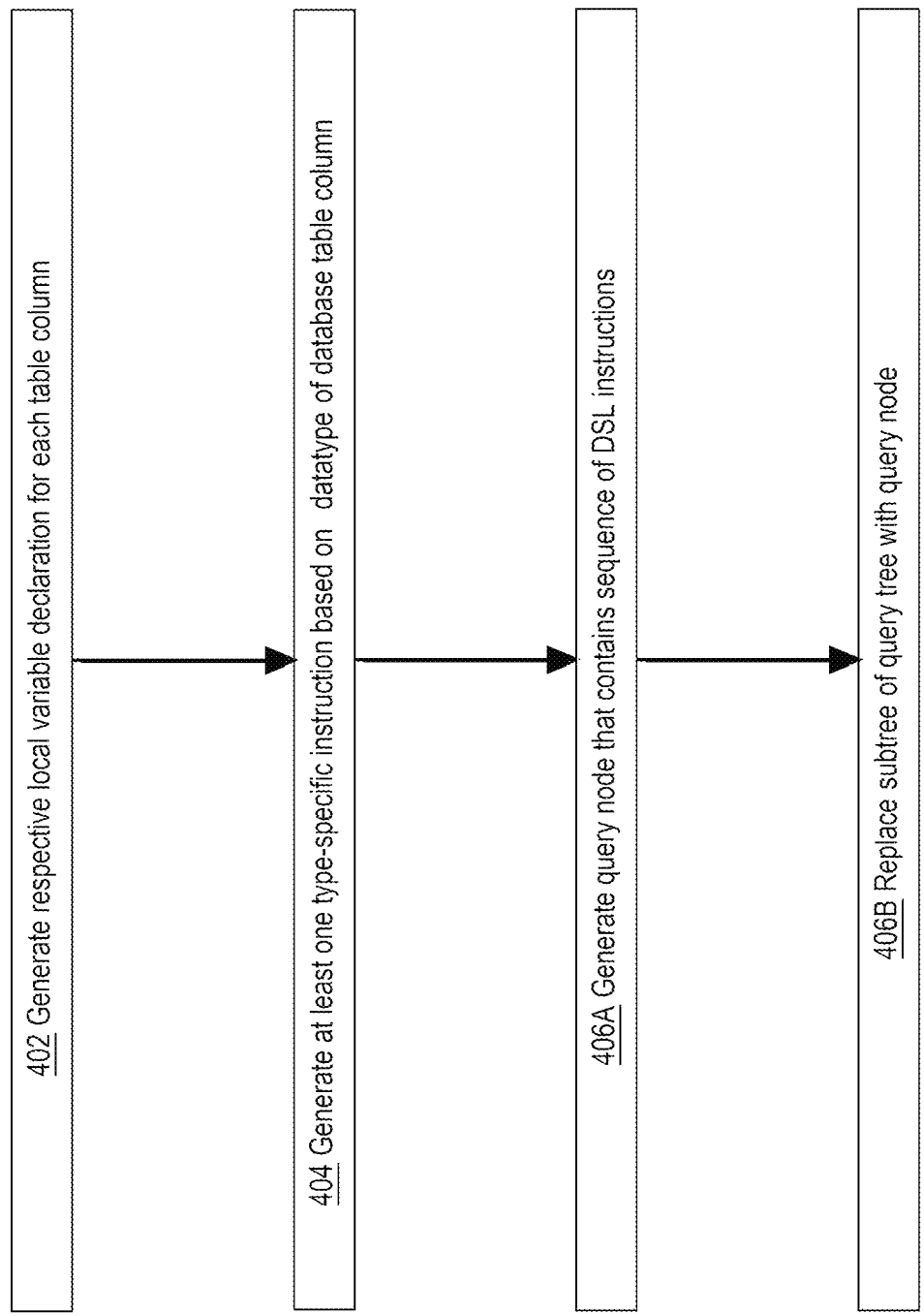
FIG. 4 is a flow diagram that depicts an example DBMS process that, in a query tree, replaces a subtree with a synthetic query node that has a partial evaluation of the subtree.

FIG. 4 is a flow diagram that depicts DBMS 300 replacing, in query tree 340, subtree 350 with synthetic query node 366 that has a partial evaluation of subtree 350, in an embodiment. FIG. 4 is discussed with reference to FIG. 3.

The process of FIG. 4 occurs in two phases that may occur in rapid succession. Steps 402 and 404 generate DSL instruction sequence 370. Steps 406A-B insert DSL instruction sequence 370 into query tree 340.

Step 402 may read a database schema and/or database dictionary of a database in DBMS 300 to discover schematic details such as tables, their columns, and express or implied relations between tables. Step 402 may instead or additionally receive such information from a query optimizer, a query planner, and/or a semantic analyzer for query tree 340. Thus, step 402 detects that query expression 320 references table columns 331-332. Local variable declarations 381-382 are generated as DSL instructions that may provide functionality such as access and/or typing of actual data in respective table columns 331-332.

Step 404 generates a type-specific instruction. For example, a datatype of table column 331 or 332 may be obtained as described for other schematic details for step 402. For example, query nodes 361-362 may already be specialized for respective datatypes, and/or query nodes 361-362 may have metadata that indicates the respective datatypes.

For example, table column 331 may store text that should be processed differently from numbers. Thus, step 404 generates type-specific DSL instruction 390 that is specialized for text processing. In an example not shown, when DSL instructions 382 and 390 are actually a same single instruction, then steps 402 and 404 occur together as a single step to generate that same single instruction. In other words, local variable declaration 382 may be type-specific. For example, the particular DSL may be strongly typed.

Step 406A generates synthetic query node 366 that contains DSL instruction sequence 370. For example, DSL instruction sequence 370 may reside in a RAM buffer, and query node 366 may store an address, pointer, handle, and/or offset to and/or into that buffer.

As explained elsewhere herein, an AST, bytecode, and/or machine code may, at various times, already or eventually be generated directly or indirectly from DSL instruction sequence 370. Such generated material may be dynamically attached to query node 366, such as by memory pointer, so that (e.g. repeatedly) operating query node 366 always executes a latest generated implementation. Thus, operating query node 366 may sometimes interpret bytecode and other times directly execute machine code.

In any case, query node 366 should be inserted into query tree 340 before invoking query node 366. In query tree 340, step 406B replaces subtree 350 with query node 366. Thus, query tree 340 is to some extent mutable, such as for optimization.

5.0 Partial Evaluation

Figure 5:
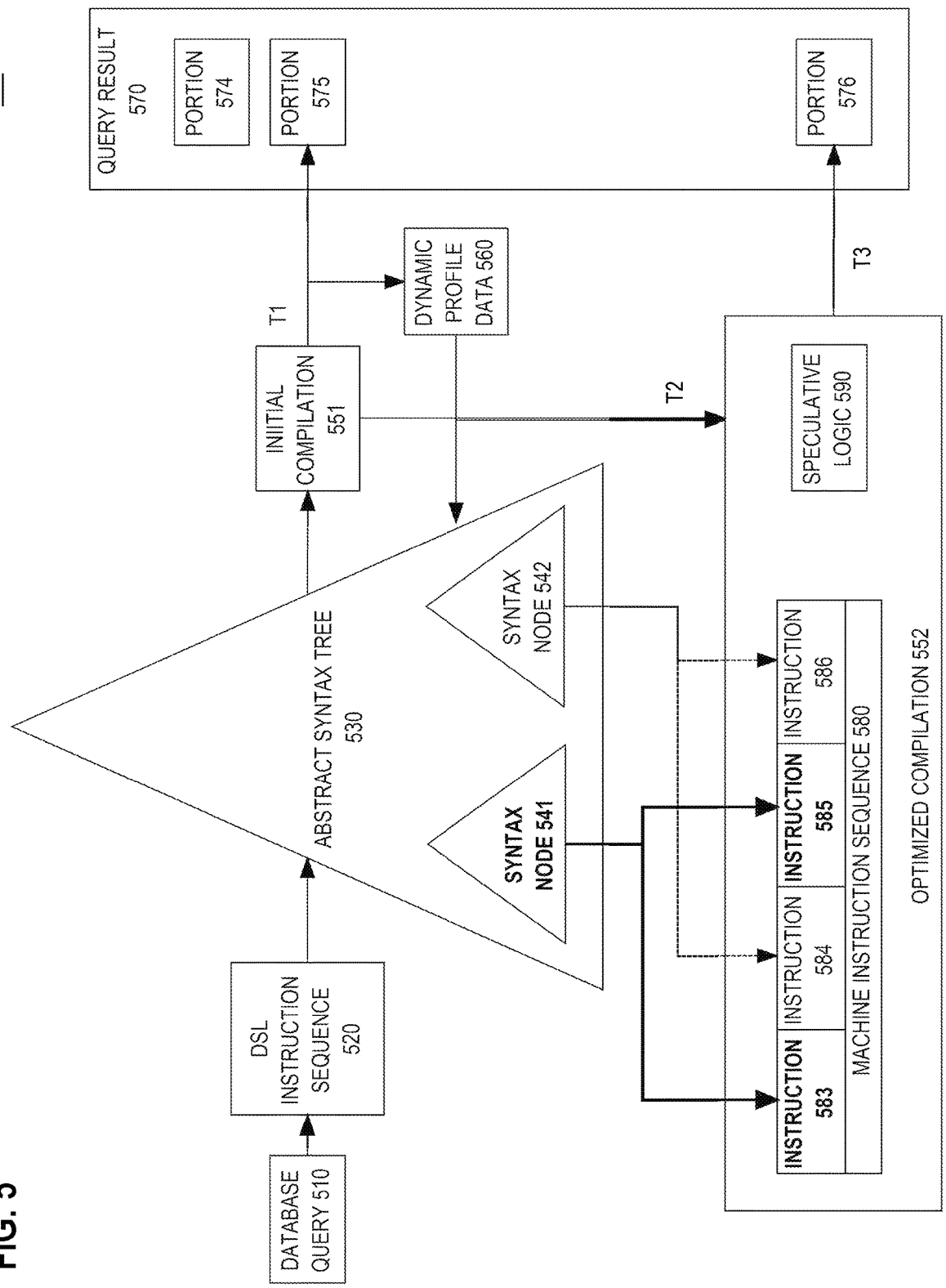
FIG. 5 is a block diagram that depicts an DBMS that demonstrates progressive optimization, such as with partial evaluation.

FIG. 5 is a block diagram that depicts an example DBMS 500, in an embodiment. DBMS 500 demonstrates progressive optimization, such as with partial evaluation. For example, DBMS 500 parses DSL instruction sequence 520 to generates DSL AST 530 that can later be optimally rewritten and from which initial compilation 551 may be immediately generated and further refined into optimized compilation 552 as follows. DBMS 500 may be an implementation of the DBMS (not shown) of computer 100.

Upon receiving database query 510 and although not shown, a query tree may be generated from database query 510. DSL instruction sequence 520 may be generated from some or all of that query tree. DSL instruction sequence 520 may be parsed to generate DSL AST 530. Thus, two trees may be generated that each represent at least part of database query 510.

In a more efficient embodiment not shown, DSL instruction sequence 520 is not generated, and instead DSL AST 530 is directly generated from some or all of the query tree. In a less efficient embodiment, database query 510 is a statement in a DML that also is an extensible markup language (XML), such as SQL/WL or XQuery, such that extensible stylesheet language (XSL) may be applied to some or all of database query 510 to generate DSL instruction sequence 520.

In an embodiment, Oracle Truffle may parse DSL instruction sequence 520 to generate DSL AST 530. In an embodiment, a configurable parser may use a formal grammar that defines the particular DSL.

An Oracle technology stack may include Truffle, Graal, Substrate, and a Java virtual machine (JVM). Such a tool chain provides robust optimizations such as partial evaluation, AST rewriting, just in time (JIT) compilation, dynamic profiling, datatype inferencing, speculative logic, and Futamura projection, as discussed herein.

For example, a JVM may defer garbage collection (GC) until convenient, and a C program typically would not. For example, C's free function and C++'s delete operator may be somewhat unstable as to what heap housekeeping actually occurs in the foreground (i.e. critical path of execution) by the standard library in a worst case.

JVM GC techniques such as parallel GC and generational scavenging, along with hotspot just in time (JIT) compilation, may cause faster execution than C in some cases. Thus, a JVM-based database query engine might (e.g. soon or eventually) constitute a better use of plentiful chip circuitry than state of the art database operation.

Optimization/generation of code may be eager or lazy and occur in the foreground (i.e. critical path) or background (e.g. spare CPU core or thread). A database may store regularized data, such as table rows, that encourage iteration. Thus, execution of database query 510, even once, may entail massive repetition, such as with a table scan. Progressive optimizations may be generated more or less in phases while database query 510 executes. Those optimization/generation phases may or may not be separated by lazy thresholds that only sufficient repetition can cross, such as with a hotspot.

Lazy optimization has two major benefits. First, laziness achieves prioritization, such that hotspots are optimized first, and unused code need never be optimized. Second, as discussed later herein, laziness facilitates dynamic optimization. Whereas, eager optimization only has static optimizations. For example, datatype inference and speculative logic may rely on laziness as discussed later herein. For example, laziness can achieve optimization feedback loops, and eager optimization cannot.

For example, query result 570 may be generated in fulfilment of database query 510. Query result 570 may be generated in increments such as portions 574-576, which are generated in sequence. At first, only a query tree may be generated and directly interpreted to process some rows of a table to generate portion 574. Concurrently with generating result portion 574, DSL AST 530 may be generated from the query tree, and initial compilation 551 to bytecode and/or machine code may be generated from some or all of DSL AST 530. Initial compilation 551 may be expedient (i.e. naïve), with limited or no optimization, such as only static optimization.

When initial compilation 551 is ready (i.e. generated), then direct interpretation of the query tree may cease, and initial compilation 551 may execute at time T1 to process some more rows of the same table to generate result portion 575. Initial compilation 551 may be accompanied by mechanisms (e.g. instrumentation) so that dynamic profile data 560 may be recorded while initial compilation 551 executes during T1. Thus, execution of initial compilation 551 generates result portion 575 and dynamic profile data 560. Dynamic profile data 560 may include details such as observed datatypes for datatype inferencing for generation of speculative logic, and execution frequency such as with basic blocks or individual instructions, such as for dead code elimination or hotspot detection such as tight loops.

At time T2, further optimization is possible, such as generating optimized compilation 552, in the following scenarios, as a replacement of initial compilation 551. For example, optimized compilation 552 may have intensive static optimizations. For example, generation of compilations 551-552 may be concurrently initiated on separate processor cores, with initial compilation 551 completing generation and being put into service first. In another example, dynamic profile data 560 may provide feedback needed for generating optimized compilation 552, with both compilations 551-552 generated at different times directly from DSL AST 530. In another example, optimized compilation 552 is a refinement of initial compilation 551 based on dynamic profile data 560 and/or secondary static optimization such as with a peephole.

With datatype inferencing according to dynamic profile data 560, optimized compilation 552 may include speculative logic 590 that presumes datatypes. Speculative logic 590 may be accompanied by guards for deoptimization when a type presumption proves to be wrong. For example, initial compilation 551 may be cached and then reinstated if speculative logic 590 is invalidated. Otherwise at time T3, optimized compilation 552 executes successfully to process more rows of the same table to generates result portion 576. Thus, all of result portions 574-576 may be generated for a same DML expression in database query 510, but each by a respective (e.g. very) different generated implementation. For example, portion 574 may be generated by interpretation of DSL AST 530; portion 575 may be generated by bytecode interpretation; and portion 576 may be generated by direct execution of machine code.

DBMS 500 may be unique in its ability to propagate runtime feedback backwards along the optimization/generation pipeline, and to do so back to any pipeline stage, including all the way back to the earliest stage. The state of the art may use low level virtual machine (LLVM) for optimization, which has no such capability. For example, datatype inference and hotspot detection, such as with dynamic profile data 560, may propagate far enough backwards for innovative optimizations such as rewriting DSL AST 530 or even regenerating DSL instruction sequence 520. Such deep feedback, especially when combined with partial evaluation, may achieve radical optimizations such as Futamura projections as explained later herein.

For further optimization, later stages of the optimization/generation pipeline may obscure structural boundaries that were artificially imposed by earlier stages. For example, DSL AST 530 contains syntax nodes, such as 541-542, that more or less reflect the semantics of database query 510. For example, separate clauses of database query 510 may be represented by separate subtrees of DSL AST 530.

Whereas, optimization/generation of optimized compilation 552 may have intensive optimizations that are based on disregarding artificial boundaries such as query nodes, syntax nodes 541-542, and subtrees of a query tree or of DSL AST 530. For example, optimized compilation 552 may contain sequence 580 of machine or bytecode instructions that interleaves instructions 583 and 585 for syntax node 541 with instructions 584 and 586 for syntax node 542. Thus, DSL AST 530 may be more or less obscured (i.e. lost) within instruction sequence 580.

6.0 Example Optimization Process

Figure 6:
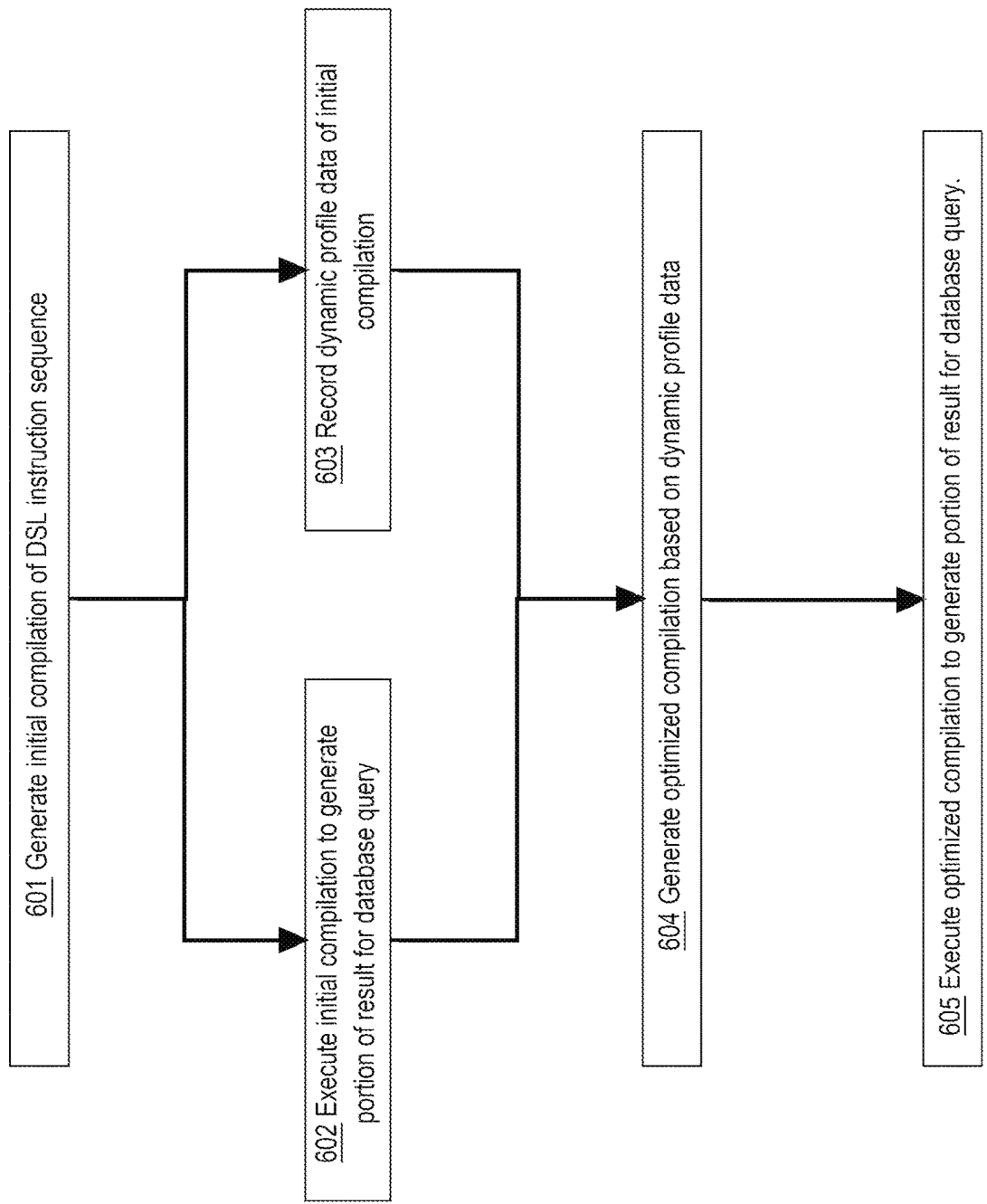
FIG. 6 is a flow diagram that depicts an example DBMS process that generates compilations directly or indirectly from a DSL instruction sequence.

FIG. 6 is a flow diagram that depicts DBMS 500 generating compilations 551-552 directly or indirectly from DSL instruction sequence 520, in an embodiment. FIG. 6 is discussed with reference to FIG. 5.

Generation and use of DSL AST 530 is demonstrative. Depending on the embodiment, a compilation such as 551 is generated from DSL AST 530 or directly from DSL instruction sequence 520 without creating DSL AST 530.

Step 601 compiles DSL AST 530 to generate initial compilation 551 that may be a naïve compilation to bytecode and/or machine code, with little or no optimization.

Steps 602-603 concurrently occur at time T1. Step 602 executes initial compilation 551 to generate portion 575 of query result 570. While initial compilation 551 executes, step 603 records dynamic profile data 560 of initial compilation 551. For example, step 603 may record observed datatypes for type inferencing and logic frequencies for detecting hotspots.

At time T2, step 604 generates optimized compilation 552 based on dynamic profile data 560. In one example, dynamic profile data 560 is applied to initial compilation 551 to generate optimized compilation 552. In another example, both of dynamic profile data 560 and DSL AST 530 are used to generate optimized compilation 552. In either case, step 604 may use dynamic profile data 560 for optimization analytics such as type inferencing and/or hotspot detection.

At time T3, step 605 executes optimized compilation 552 to generate result portion 576. Examples of optimizations, such as for incorporation into optimized compilation 552, are as follows.

7.0 Additional Optimizations

Figure 7:
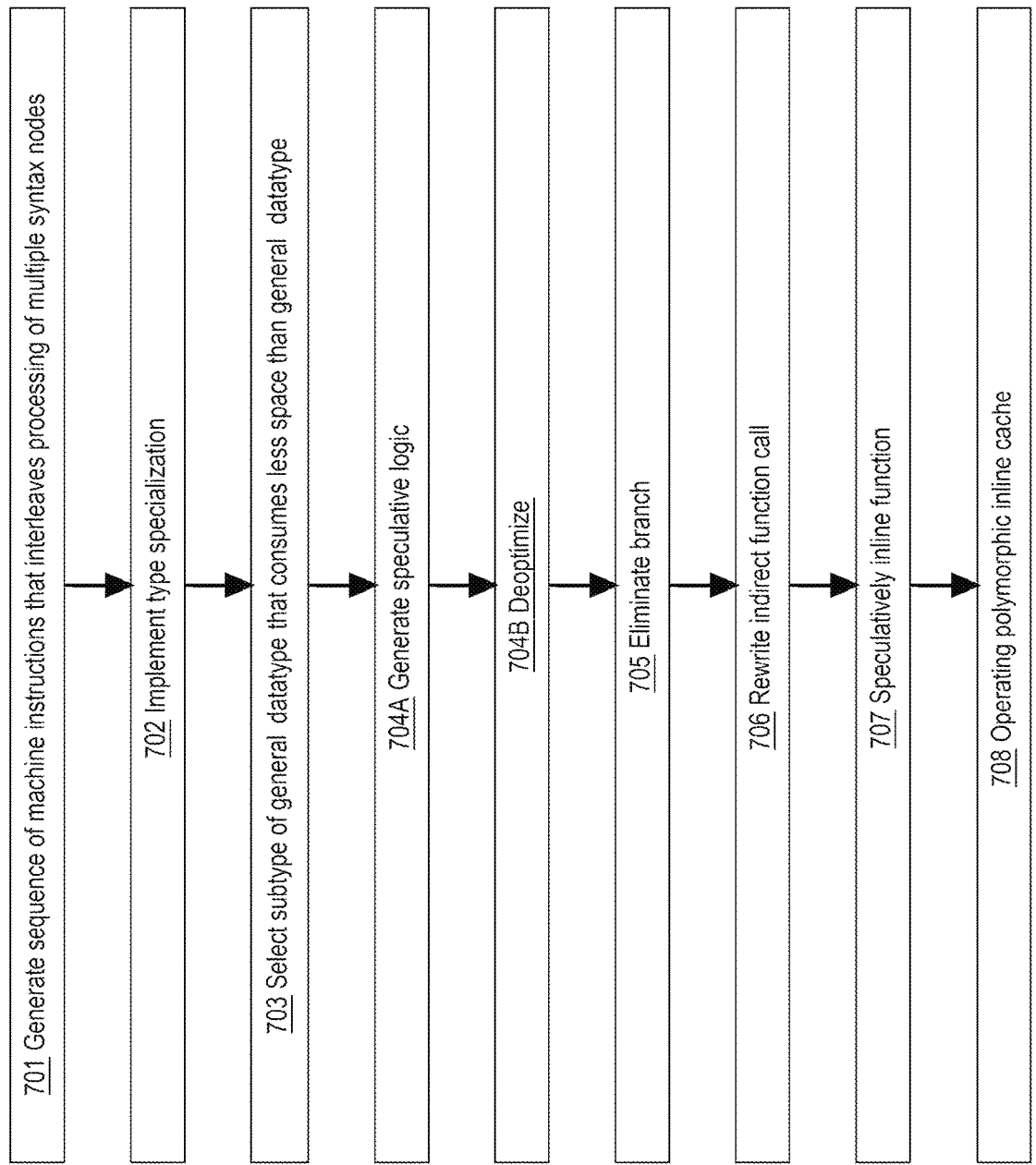
FIG. 7 is a flow diagram that depicts examples of optimizations by a DBMS, such as for incorporation into optimized compilations.

FIG. 7 is a flow diagram that depicts examples of optimizations by DBMS 500, such as for incorporation into optimized compilation 552, in an embodiment. FIG. 7 is discussed with reference to FIG. 5.

Step 701 generates an instruction sequence that interleaves processing of multiple tree nodes. Embodiments may apply interleaving at any optimization/generation pipeline stage that generates instructions. For example and although not shown, database query 510 may be parsed into a query tree of query nodes. Respective DSL instruction(s) may be generated from each query node, and DSL instructions for different query nodes may be interleaved. For example, local variable declarations from multiple query subtrees may be hoisted to the beginning of DSL instruction sequence 520.

In another example as shown, respective bytecodes or machine codes may be generated from each syntax node 541-542, and those codes for different syntax nodes may be interleaved. For example, a code generator may reorder instructions by dispersing (i.e. breaking up) a cluster of memory-bus intensive code for syntax node 541 to interleave computation for syntax node 542. In another reordering example, some instructions of syntax nodes 541-542 may become clustered together, such as to for when a shared datum from RAM is temporarily available in a register.

Step 701 may or may not occur solely based on static analysis. Whereas, steps 702-706 have dynamic optimizations that may require analyzing dynamic profile data 560, such as for type inferencing.

Step 702 implements type specialization in optimized compilation 552, DSL AST 530, and/or DSL instruction sequence 520. For example, instruction 583 may be specialized for text processing, such as according to type inferencing.

Motivations for type specialization include streamlining to save time and/or space. For example, step 703 selects a subtype that needs less storage space than an original (i.e. general) type. For example, an integer variable that indicates a calendar month may be demoted from a machine word to a byte. Likewise, a database table column may be dictionary encoded, and its encoding dictionary may imply that at most a few bits or byte(s) are needed. For example, a byte is ample space to store any value when a dictionary has only tens of keys. In an embodiment, the encoding dictionary is itself stored in a database schema or database dictionary.

Step 704A generates speculative logic 590 based on an inferred type. For example, a byte may be wide enough to store any value observed for a particular variable so far. Thus, speculative logic 590 treats that variable as a byte.

However, an inferred type may eventually be violated. For example, that particular byte variable may eventually encounter a value that needs more byte(s) to store. Thus, step 704B may be caused when a guard detects an offending (i.e. big) value. Step 704B deoptimizes optimized logic 552. For example, initial compilation 551 may be regenerated or retrieved from cache.

Step 705 eliminates a control flow branch, such as for dead code elimination. For example, type inferencing may reveal that all values of a numeric variable are non-zero. Thus, logic to detect and specially handle arithmetic division by zero may be eliminated.

Type inferencing is motivated by polymorphism, where same source logic may process values of different actual types. Object oriented techniques such as inheritance and/or duck typing encourage polymorphism, for which mechanisms are available such as dynamic dispatch of virtual methods. Thus, a caller may invoke a method without knowing that the method may have multiple implementations.

Techniques based on a thunk, a trampoline, or a dispatch table may provide indirection needed to select and invoke a particular implementation of a method. Type inferencing facilitates eager selection of a particular implementation of a method, which is efficient. Thus, step 706 may rewrite logic to directly invoke the particular implementation instead of traversing an indirection structure.

For example, step 707 may go even further by inlining (i.e. embedding) that selected implementation directly into the caller's logic. For example, a spider may be a subtype of an animal whose leg counting method always returns eight. Thus, a literal constant eight may be inlined into a caller whose animals all are spiders, as determined by type inference.

For example, step 708 may go even further by operating a polymorphic inline cache, which helps when datatype inferencing can narrow a variable to a few different datatypes but not down to a single type. A polymorphic inline cache operates as an incrementally growing dispatch table that is initially empty and can add and retain bindings to particular implementations of a method when respective subtypes are eventually encountered. If that dispatch table has an upper limit on how many bindings to store, then the dispatch table stops growing, but does not evict already cached bindings. Each call site that invokes a same method may have its own respective polymorphic inline cache, whose contents may diverge (i.e. differentiate) even though the same nominal (i.e. abstract) method is targeted by different call sites.

8.0 Program Transformations

Figure 8:
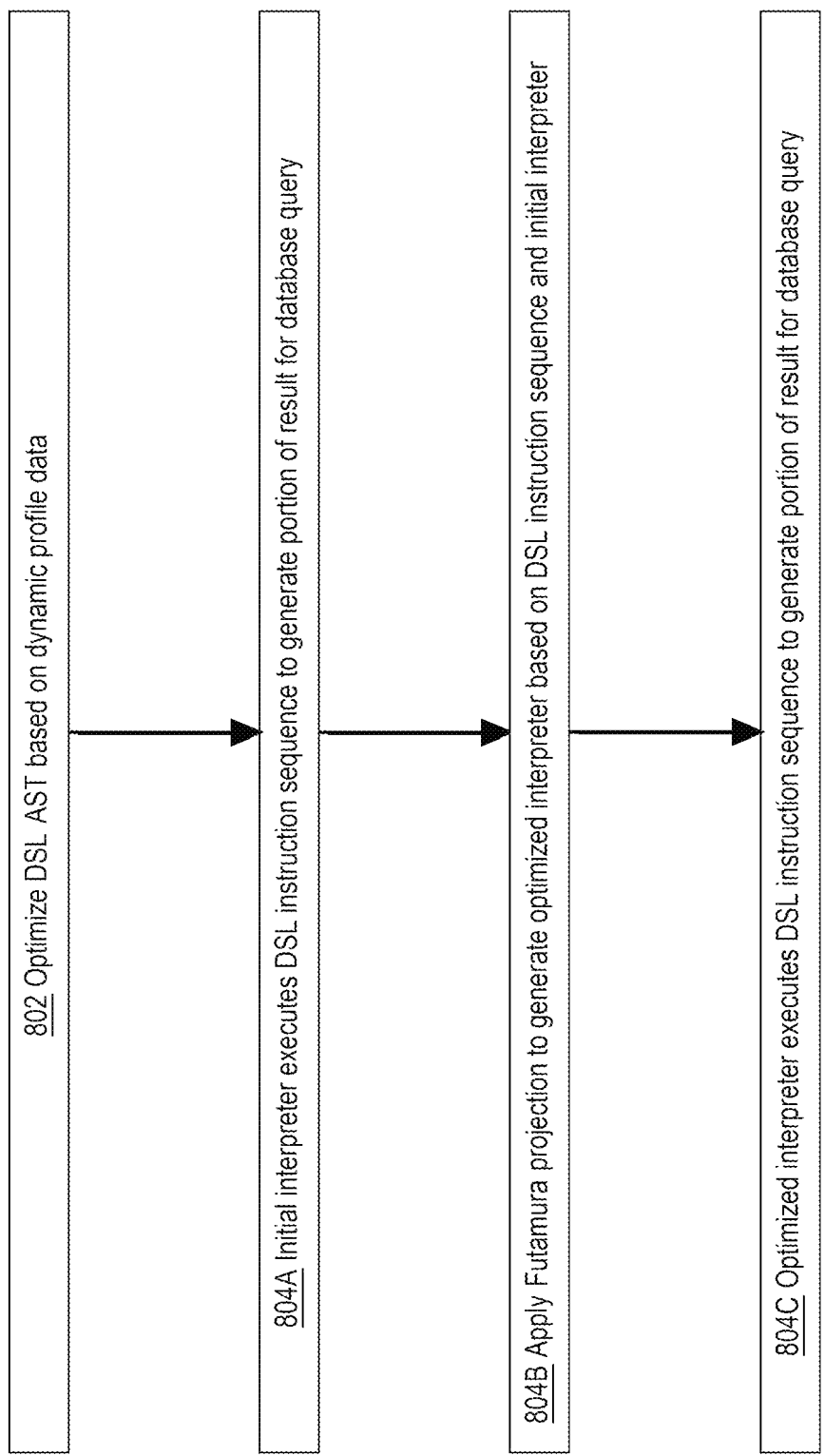
FIG. 8 is a flow diagram that depicts examples of two program transformations by a DBMS that accelerate interpretation and/or compiled execution.

FIG. 8 is a flow diagram that depicts examples of two program transformations by DBMS 500 that accelerate interpretation and/or compiled execution, in an embodiment. FIG. 8 is discussed with reference to FIG. 5.

Step 802 depicts DSL AST optimization based on runtime feedback. For example, DSL AST 530 may be rewritten (i.e. optimized) based on dynamic profile data 560. For example, dynamic profile data 560 may indicate that a control flow branch remains unused after iterating over 1,000 table rows so far. DSL AST 530 may be rewritten with such dead code eliminated and replaced by a guard. If the guard eventually encounters a need for the missing control branch, then a previous DSL AST 530 can be reinstated (e.g. regenerated or from cache), or the missing branch can be copied from the previous DSL AST 530 and inserted into the deficient current DSL AST 530.

When DSL AST 530 is ready, its bytecode and or machine code can come from cache or be (re-)generated, either eagerly or lazily. Instead of waiting for code generation to complete, DBMS 500 may continue executing DSL AST 530 by direct interpretation, which may simultaneously occur while code generates in the background. That is, DBMS 500 may traverse and operate syntax nodes 541-542 to continue processing table rows.

An engineer might expect DSL AST interpretation to be slow. However, a DSL AST interpreter that can itself optimally evolve may accumulate many mutations (i.e. optimizations). For example, a guard may notice expiration of one type inference, but that need not invalidate most other type inferences. With partial evaluation, reversion of the interpreter can be very selective in scope.

Usually for example, most of the interpreter should remain intact when speculative logic expires. Thus, an optimizer stack such as Truffle, Grail, and Substrate may invest heavily in optimizing the DSL AST interpreter with confidence that most of that investment will be preserved for amortization. For example, the interpreter is itself subjected to dynamic analysis such as partial evaluation, specialization and other (e.g. speculative) optimization, and JIT compilation.

The DSL AST interpreter may be itself be optimized based on dynamic profile data 560, which may cause the interpreter to become more or less exclusively specialized for database query 510, such as when each query has its own DSL AST interpreter instance that can be independently optimized and discarded immediately after fulfilling the query. An embodiment caches interpreter instances in case a query is reused.

As explained earlier herein, unlike a general purpose programing language, a DSL typically has a narrow (i.e. special) purpose that is more or less limited to a particular subject matter domain, such as a particular technological concern. Because a DSL has a narrower scope than a general purpose language, the DSL's grammar may be much smaller (i.e. simpler). Thus, DSL tooling such as a tokenizer, parser, semantic analyzer, code generator, optimizer, runtime profiler, and/or interpreter may be greatly streamlined compared to general purpose tooling.

Such lean tools should themselves have a smaller codebase, with simpler flows of control and data. With optimization techniques herein, such lean tools, as optimizable artifacts themselves, are made substantially leaner, such as when a type inference obviates some of a DSL interpreter's own logic. Obviated interpreter logic is fit for dead code elimination, which results in a smaller and faster DSL interpreter, such as by Futamura projection.

Futamura projection is a way to shrink and accelerate an interpreter's codebase in memory during interpretation (i.e. interpreter operation). A naturally lean DSL interpreter, further optimized by Futamura projection, can save computer resources such as time and scratch space. An optimized DSL interpreter can become so small that each query may have its own instance of a DSL interpreter that is independently optimized just for that query.

With amortization of optimization overhead (i.e. latency) across database records, such as in a database table or intermediate result set, an optimizable DSL interpreter may substantially accelerate an ad hoc query. Thus, an optimizable DSL interpreter may be readily embedded into a query engine of a DBMS according to techniques herein. Whereas, state of the art database operation based on C/C++ may be more or less impossible to optimize in innovative ways such as Futamura projection.

Interpreter specialization to fit a particular query is an example of Futamura projection, of which there are several progressive degrees (i.e. projections) along a spectrum of intensity ranging from, at one end of the spectrum, optimizing the interpreter, to recasting the optimized interpreter into a compiler or, at the other end of the spectrum, to optimizing the compiler. Steps 804A-C achieves at least a first degree Futamura projection (i.e. interpreter optimization). Steps 804A and 804C show that a DSL AST interpreter may process some table rows before and after that interpreter undergoes a Futamura projection in step 804B. Futamura projection efficiency may depend on massive iteration of table rows to amortize optimization overhead (e.g. initial latency).

9.0 Example Implementation

This example implementation is based on Truffle, Graal, and Substrate as software layers that cooperate as follows. In this example, the particular DSL is multilingual engine stub language (MSL) for SQL expressions. An MSL AST is initially interpreted (i.e. directly operated).

When the execution count of an AST node reaches a predefined threshold, Truffle triggers partial evaluation by a call to the Graal compiler. By compiling the program represented by the AST tree together with its interpreter the first Futamura projection is achieved. The output is highly optimized machine code with deoptimization points. Those points are implemented as check points where deoptimization is triggered when the speculative assumptions do not hold anymore. Deoptimization means that control is transferred back from the compiled code to the AST interpreter, where specialized nodes are then reverted to a more generic version.

Instead of interpreting MSL or generating code and statically compiling it as LLVM does, MSL can be evaluated by leveraging the Truffle framework. The SQL standard defines a grammar for SQL language and subsequently a grammar for SQL expressions. Hence SQL expressions can be described through a language. Consequently, SQL expressions can be implemented as a Truffle language such as MSL.

By implementing SQL expressions as a Truffle language the benefits of the Truffle framework and the Graal compiler can be leveraged. Specifically, that includes:

The overall idea of recognizing SQL expressions as a language that can be "truffelized". The new language is multilingual engine stub language (MSL);

A MSL generator: an algorithm that given an expression tree, generates MSL code;

A MSL parser: an algorithm that parses MSL code and instantiates the corresponding MSL Truffle AST nodes;

An architecture of how to embed the Truffle and Graal compiler framework into a DBMS. In particular, a new SQL expression node is introduced that is responsible for storing MSL code at the query compilation phase, and executing MSL code at the query execution phase. The new SQL expression node will replace the root of the corresponding SQL expression tree.

A MSL generator translates a given SQL expression tree into MSL code. The MSL code is generated at the query compilation stage for a given SQL expression tree. The MSL code is stored into a dedicated field of the novel expression query node. During query execution, when the expression node is evaluated, the DBMS invokes the MSL parser to parse the MSL code to instantiate the corresponding MSL Truffle AST nodes.

At this point the AST nodes can be evaluated. During SQL execution, runtime profiles are collected that may result in type specialization. After a certain threshold, when a SQL expression was executed many times, Graal triggers partial evaluation. During this step the Graal compiler produces optimized machine code. Aggressive code inlining is one example of the optimization techniques applied here. By inlining code, Truffle nodes are fused along an expression operand pipeline which enforces data locality and removes call overheads.

By applying those strategies the traditional interpretation overhead is removed. Approaches herein make use of Truffle's self optimizing features like type specializations or branch elimination that are based on the collected runtime profiles. Just in time compilation is deferred to a point when Graal considers it worthwhile. At such a point, Graal can take advantage of already made code specializations and include them into the partial evaluation step. One beneficial side effect of this is that this approach does not have to pay the high upfront compilation costs when compared with the LLVM approach. Although those costs are only deferred and do incur when Graal triggers the background compilation thread.

Making code specializations relies on the correctness of previously made specialization assumptions. However if the characteristics of the input data change, an assumption might not hold anymore. Hence the specialize code needs to be unspecialized. But instead of aborting the query, Graal offers two alternatives: (1) either revert to a more general code path during interpretation or, if already compiled, (2) Graal offers deoptimization. This adaptive approach ensures correctness and improved performance for those type of scenarios.

The approach proposed here consists of two phases: MSL plan generation and MSL plan execution. Those phases are triggered by the corresponding RDBMS phases: plan generation and plan execution. During RDBMS plan generation the SQL expression trees are generated. At the end of the generation of a SQL expression tree, the RDBMS checks if a MSL plan can be generated for the corresponding SQL expression tree.

In some scenarios, the RDBMS cannot generate an equivalent MSL plan. The most common reason is that a certain operation is not implemented in MSL yet. In those cases, the RDBMS may take over sub-expression trees, that are attached to a infeasible operation.

For the majority of scenarios where an equivalent MSL plan is generated the root node of the SQL (sub-) expression tree is substituted by a SQL expression node. Starting with the root node, all SQL expression tree nodes that are descendants of the root node, except the leaf nodes are replaced by one and the same SQL expression node. The leaves of the SQL expression tree are attached as direct children to the SQL expression node.

The MSL plan that is generated is stored in the SQL expression node. At the RDBMS execution phase when the SQL expression node is evaluated, first all of its children are evaluated. After that the MSL plan is parsed, instantiated and executed by Graal.

The following is an example SQL query. It computes a simple SQL expression that adds the number 1 to the empno column. That entails a simple SQL expression of empno+1.

```
select empno+1 from emp;
```

The following shows the MSL plan for that query in JSON formatting.

```
{
    "CMD" : "STUB FUNCTION" ,
    "NAME" : "Expression", "VARIABLES "
: [
        {
         " ID " : " column 0 " , "DATATYPE" : "DTYNUM"
        },
        {
         " ID " :
        "column0specialized0", "DATATYPE" : "DTYNUM"
        },
        {
         " ID " : "OPTTADcse00",
         "DATATYPE" : "DTYNUM"
        }
    ],
    "BODY" : [
        {
         "CMD" : "ASSIGN COLUMN" , "OPNMUT" :
         "QEE TYPE " : "QEETYP OPT" ,
         "OPT TYPE " : "READ EXTPTR ARG" , "EXTPTR ARG IDX
" : 1
         ,
         "VARIABLE " : " column 0 "
        },
        {
         "CMD" : "ASSIGN" ,
         "VARIABLE " :
         "column0specialized0", "VALUE" :
         "QEE TYPE " : "QEETYP OPT" ,
         "OPT TYPE " : "COLUMN TO NUMBER" , "ARGS" : [
            {
               "QEE TYPE " : "QEETYP OPT" ,
               "OPT TYPE " : "READ" , "VARIABLE " : "
            column 0 "
            }
         ]
        },
        {
         "CMD" : "ASSIGN" ,
         "VARIABLE " : "OPTTADcse00",
    "VALUE" :
         "QEE TYPE " : "QEETYP OPT" , "OPT TYPE " :
    "OPTTAD" , "BUFFER " : {
            "POINTER " :
            "QEE TYPE " : "QEETYP OPT" ,
            "OPT TYPE " : "READ EXTPTR ARG" , "EXTPTR ARG
         IDX " : 0
            ,
            "BUFLEN" : 22
         },
         "ARGS" : [
            {
               "QEE TYPE " : "QEETYP OPT" ,
               "OPT TYPE " : "READ" ,
               "VARIABLE " :
                  "column0specialized0"
            },
            {
               "QEE TYPE " : "QEETYP CONST" ,
               "OPT TYPE " : " SPECIALIZED LITERAL " ,
               "DATATYPE" : "DTYNUM" ,
               "BASE 64 VALUE " : "wQI="
```

-continued

```
            }
          ]
        }
    },
    {
        "CMD" : " CALL BUILTIN STMT " , " BUILTIN " : "SET OPNMUT" , "ARGS" : [
            {
                "QEE TYPE " : "QEETYP OPT" ,
                "OPT TYPE " : "READ EXTPTR ARG" , "EXTPTR ARG IDX
" : 3
            },
            {
                "QEE TYPE " : "QEETYP OPT" ,
                "OPT TYPE " : "NUMBER TO COLUMN" , "BUFFER " :
                "POINTER " :
                "QEE TYPE " : "QEETYP OPT" ,
                "OPT TYPE " : "READ EXTPTR ARG" , "EXTPTR ARG IDX
" : 2
                ,
                "BUFLEN" : 22
            },
            "ARGS" : [
                {
                    "QEE TYPE " : "QEETYP OPT" .,
                    "OPT TYPE " : "READ" , "VARIABLE " :
                      "OPTTADcse00"
                }
            ]
        }
      ]
    }
  ]
}
```

The following plan may give a better idea of the MSL shown immediately above. The following plan is in human readable form.

```
stubExpression( )
    declare DTYNUM column0
    declare DTYNUM column0specialized0
    declare DTYNUM OPTTADcse00
    column0 = assigncolumn(frameptrarg(1))
    column0specialized0 = COLUMN TO NUMBER(column0)
    OPTTADcse00 = OPTTAD(bufferframeptrarg(0) , 22 ,
    column0specialized0 , const spec DTYNUM(base64(wQI=)))
    SET OPNMUT(frameptrarg(3) , NUMBER TO
    COLUMN(buffer(frameptrarg(2) , 22 } , OPTTADcse00 ) )
}
```

Looking at the above plan, several MSL elements of a MSL program can be identified:
STUB FUNCTION. A stub function has a VARIABLES section and a BODY section
VARIABLES: The variable section declares the local variables of the MSL program.
BODY: The actual implementation of an MSL program can be found in its body. Body portions are as follows.
  The first command block assigns the input column to the MLRIRVARIABLE column 0. In this example column 0 corresponds to the empno column of the SQL expression.
  The second command block specializes the input. An embodiment has an Oracle Number implementation. Since Oracle Numbers is a variable length datatype of up to 22 bytes, computations can be quite compute intensive. The DBMS provides a decimal scaled binary (DSB) specialization for Oracle Number that is comparable with the performance of an integer specialization. In case the underlying data for a given input can be represented by a DSB, the DBMS is able to specialize the input to a DSB. That will improve performance significantly. No matter if the input is represented in specialized form or as Oracle number, it is assigned to column 0 specialized 0
  The third command block specifies how the result is computed. Hereby OPTTAD symbolizes the sum operation. Inputs are column 0 specialized 0 and the constant of 1. The result is assigned to the variable OPTTAD_cse_0_0.
  The last command block de-specializes the result and stores it in a buffer where the RDBMS expects the result in form of an Oracle Number.

This example implementation has a MSL code generator that produces the MSL code shown above.

A SQL expression tree can have the following type hierarchy.
  SQLEXPRESSION: Every SQL expression node is of type SQLEXPRESSION, but has a concrete subtype:
    SQLEXPRESSIONNODE: Those are the inner nodes of a SQL expression tree. Examples are binary operations like SUM or MULTIPLICATION.
    SQLCOLUMNNODE: Are the leaf nodes of a SQL expression tree and represents the inputs to a SQL expression.
    SQLCONSTANTNODE: Is a leaf node and represents constants like the '1' in the previous example.

The algorithms produces several MSL IR (multilingual engine stub language intermediate representation) elements. Here is its type hierarchy.
  MSLIRVARIABLE
    MSLIRCOLUMNVARIABLE
    MSLIRSPECIALIZEDVARIABLE
  MSLIREXPRESSION
    MSLIRREADEXPRESSION MSLIROPERATIONEXPRESSION
MSLIRASSIGNVALUESTMT
MSLIRCOLUMNTONUMBERSPECIALIZATIONEXPRESSION
MSLIRCOLUMNTODOUBLEEXPRESSION
MSLIRLITERALEXPRESSION An MSL plan can be generated by a call to COMPILESQLEXPRESSION as given below. Therefore, ANALYZESQLEXPRESSION (below) is invoked to analyze the SQL expression tree top-down. Depending on the SQL expression node type different sub methods are invoked.

ANALYZESQLEXPRESSIONNODE (below) checks if an identical SQL expression node has been analyzed before. If that is the case a corresponding variable would be found in FRAMESLOTVARIABLEMAP. If one could be found, then a MSLIRREADEXPRESSION is returned. If not, the children of the SQL expression node need to be analyzed before processing the SQL expression node can continue. For each child, an MSLIREXPRESSION is expected as a return value. In case the SQL expression node is able to consume specialized operands, each input should be specialized if it has not been specialized before. This is handled by a call to SPECIALIZE (below). The following is an example implementation of COMPILESQLEXPRESSION.

```
COMPILESQLEXPRESSION(root)
I>  Input: SQLEXPRESSION root
I>  Output: SQLEXPRESSION
1     declare global LIST < MSLIRVARIABLE > MSLIRVARLIST [ ]
2     declare global LIST < MSLIREXPRESSION > MSLIREXPLIST [ ]
3     declare global FRAMESLOTVARIABLEMAP [ ]
4     MSLIREXPRESSION e ANALYZESQLEXPRESSION(root)
5     stub         GENERATESTUBLANGUAGEFUNCTION( )
6     return    GENERATEEXPRESSIONOPERATOR(stub)
```

The following is an example implementation of ANALYZESQLEXPRESSION.

```
ANALYZESQLEXPRESSION(SQLEXPRESSION n)
I>  Input: SQLEXPRESSION n
I>  Output: MSLIREXPRESSION
1     if n.TYPE( ) is SQLEXPRESSIONNODE
2       return ANALYZESQLEXPRESSIONNODE((SQLEXPRESSIONNODE)n)
3     elseif n.TYPE( ) is SQLCOLUMNNODE
4       return ANALYZESQLCOLUMNNODE((SQLCOLUMNNODE)n)
5     elseif n.TYPE( ) is SQLCONSTANTNODE
6       return ANALYZESQLCONSTANTNODE((SQLCONSTANTNODE)n)
```

Once the inputs have been processed, a MSLIROPERATIONEXPRESSION is generated to encapsulate the actual operation by looking at the GETOPERANDTYPE( ). A call to COMMONSUBEXPRESSIONELEMINATION (below) preserves the result by storing it into a variable so that it could be reused if needed.

Below shows how SQLCOLUMNNODE and SQLCONSTANTNODE are handled. Important to note is that ANALYZESQLCOLUMNNODE calls REGISTERSQLEXPRESSIONARGUMENT which registers the leaf node of the SQL expression tree so that it can be attached later on by GENERATEEXPRESSIONOPERATOR to the new expression node as a direct child.

Once the call to ANALYZESQLEXPRESSION returns, the MSL plan is generated by invoking GENERATESTUBLANGUAGEFUNCTION (below).

GENERATESTUBLANGUAGEFUNCTION is looking at the MSLIRVARLIST and MSLIREXPLIST that were generated by ANALYZESQLEXPRESSION.

GENERATEEXPRESSIONOPERATOR generates the new MSL expression node that will replace the RDBMS SQL expression tree. It will register the leaves of the SQL expression tree as its children. As mentioned before the leaves have been collected by REGISTERSQLEXPRESSIONARGUMENT. The new SQL expression node will store the MSL plan in a JSON format, such as shown earlier above.

The following is an example implementation of ANALYZESQLEXPRESSIONNODE.

```
ANALYZESQLEXPRESSIONNODE(SQLEXPRESSIONNODE exp)
I> Input: SQLEXPRESSIONNODE exp
I> Output: MSLIREXPRESSION
1       if NOT exp.EXPRESSIONTYPEISSUPPORTED( )
2         return NULL
3       MSLIRVARIABLE var FRAMESLOTVARIABLEMAP[exp.FRAMESLOT( )]
4       if NOT var = NULL
```

```
5      return var.READEXP( )
6      LIST < MSLIREXPRESSION > args [ ]
7      iter exp.GETCHILDITERATOR( ).BEGIN( )
8      while NOT iter = exp.GETCHILDITERATOR( ).END( )
9        child  iter
10       args.ADD(ANALYZEEXPRESSION(child))
11       iter iter.NEXT( )
12     if exp.GETOPERANDTYPE( ).CONSUMESSPECIALIZED( )
13       for i  0..args.LENGTH( )
14         if args[i].PRODUCESCOLUMNREPRESENTATION( )
15           args.REPLACE(i,  SPECIALIZE(args[i]))
16     MSLIREXPRESSION e MSLIROPERATIONEXPRESSION(
exp.GETOPERANDTYPE( ), exp.GETDATATYPE( ), args)
17     return COMMONSUBEXPRESSIONELEMINATION(e).READEXP( )
```

The following is an example implementation of SPECIALIZE.

```
SPECIALIZE(MSLIREXPRESSION e)
▷  Input: MSLIREXPRESSION e
▷  Output: MSLIREXPRESSION
1     MSLIRVARIABLE var CREATESPECIALIZEDVAR(e.GETDATATYPE( ))
2     MSLIRVARLIST.ADD(var)
3     MSLIREXPRESSION specializedOp NULL
4     if e.DATATYPE( ) = NUMBER
5       specializedOp
MSLIRCOLUMNTONUMBERSPECIALIZATIONEXPRESSION(e)
6     else if ...
7     ...
```

The following is an example implementation of COMMONSUBEXPRESSIONELEMINATION.

```
COMMONSUBEXPRESSIONELEMINATION(e)
▷  Input: MSLIREXPRESSION e
▷  Output: MSLIRVARIABLE
1     MSLIRVARIABLE var FRAMESLOTVARIABLEMAP[e]
2     if NOT var = NULL
3       return var
4     if e.PRODUCESCOLUMN( )
5       var  CREATECOLUMNVAR(e.GETDATATYPE( ))
6     else var  CREATESPECIALIZEDVAR(e.GETDATATYPE( ))
7     MSLIRVARLIST.ADD(var)
8     MSLIREXPLIST.ADD(MSLIRASSIGNVALUESTMT(var, e))
9     FRAMESLOTVARIABLEMAP[e]  var
10    return var
```

The following is an example implementation of ANALYZESQLCOLUMNNODE.

```
ANALYZESQLCOLUMNNODE(SQLCOLUMNNODE col)
▷  Input: SQLCOLUMNNODE col
▷  Output: MSLIRREADEXPRESSION
1     MSLIRVARIABLE var  FRAMESLOTVARIABLEMAP[col.FRAMESLOT( )]
2     if NOT var = NULL
3       return var.READEXP( )
4     MSLIRVARIABLE var  NULL
5     if n.TYPE( ) is SQLEXPRESSIONNODE
6       var  CREATEOPERATIONVAR(e.getDataType( ))
7     elseif n.TYPE( ) is SQLCOLUMNNODE
8       var  CREATECOLUMNVAR(e.getDataType( ))
9     elseif n.TYPE( ) is SQLCONSTANTNODE
10      var  CREATECONSTANTVAR(e.getDataType( ))
11    FRAMESLOTVARIABLEMAP[col.FRAMESLOT( )]  var
12    REGISTERSQLEXPRESSIONARGUMENT(col)
13    return var.READEXP( )
```

The following is an example implementation of ANA-LYZESQLCONSTANTNODE.

```
ANALYZESQLCONSTANTNODE(SQLCONSTANTNODE con)
▷  Input: SQLCONSTANTNODE con
▷  Output: MSLIREXPRESSION
1    if con.ISBIND( )
2        return ANALYZESQLCOLUMNNODE((SQLCOLUMNNODE)con)
3    else return MSLIRLITERALEXPRESSION(con.GETDATATYPE( ),
con.GETVALUE( ))
```

The following is an example implementation of GENERATESTUBLANGUAGEPLAN.

```
GENERATESTUBLANGUAGEFUNCTION( )
▷     Output: MSLIREXPRESSION
1        declare MLSIRVARIABLES VARIABLES
2        declare MLSIRBLOCK BLOCK
3        varIter  MSLIRVARLIST.BEGIN( )
4        while NOT varIter = MSLIRVARLIST.END( )
5            MSLIRVARIABLE var  varIter
6            VARIABLES.ADD(var)
7            varIter  varIter.NEXT( )
8        varIter  FRAMESLOTVARIABLEMAP.BEGIN( )
9        while NOT varIter = FRAMESLOTVARIABLEMAP.END( )
10           MSLIRVARIABLE var  varIter
11           BLOCK.ADD(ASSIGNCOLUMN(var,
OPNMUTREFERENCE(var.GETFRAMESLOT( )))
12           varIter  varIter.NEXT( )
13       expIter  MSLIREXPLIST.BEGIN( )
14       while NOT expIter = MSLIREXPLIST.END( )
15           MSLIREXPRESSION e  expIter
16           BLOCK.ADD(e)
17           expIter  expIter.NEXT( )
18       return MLSIRFUNCTION(VARIABLES, BLOCK)
```

10.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

10.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
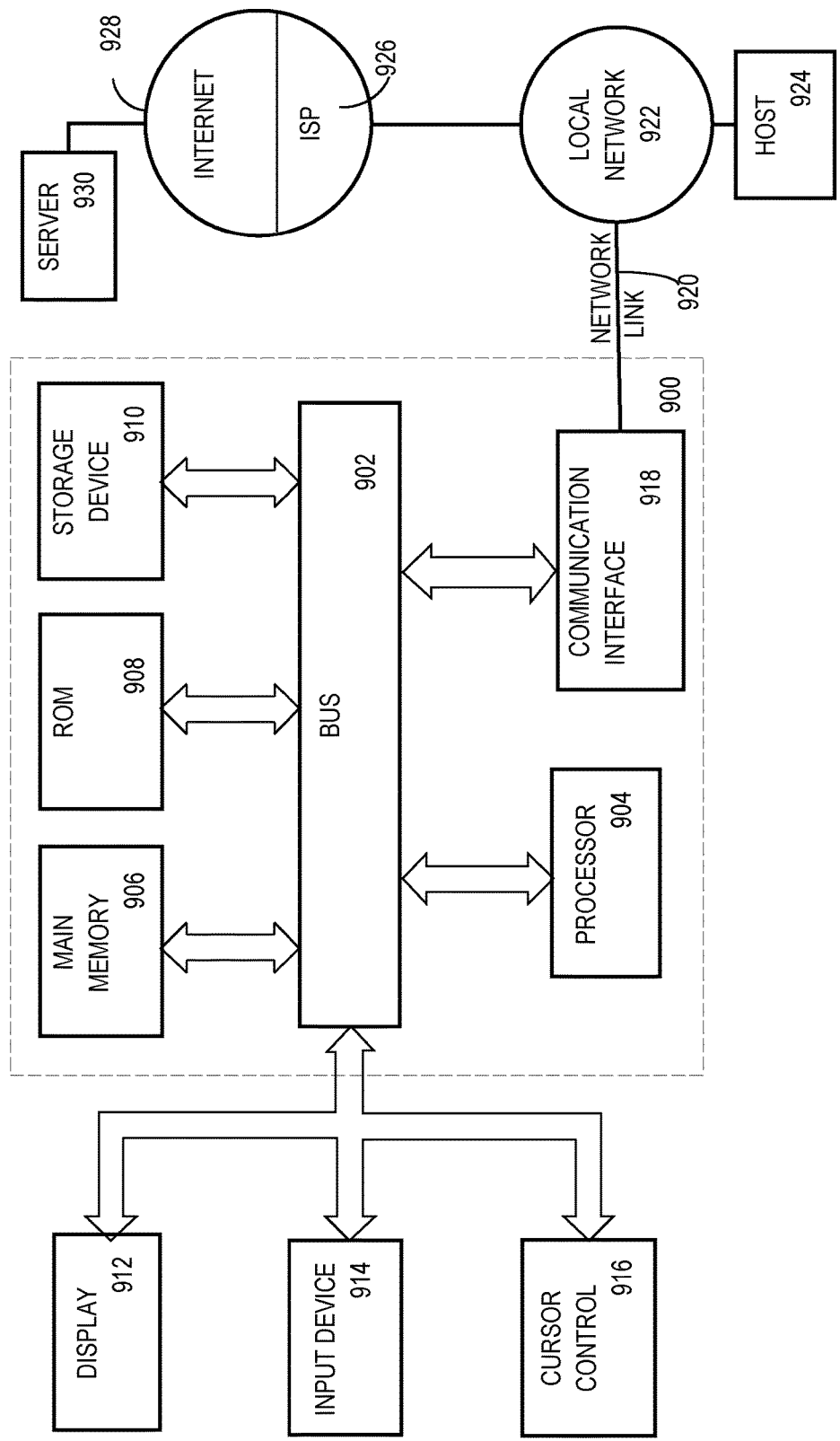
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
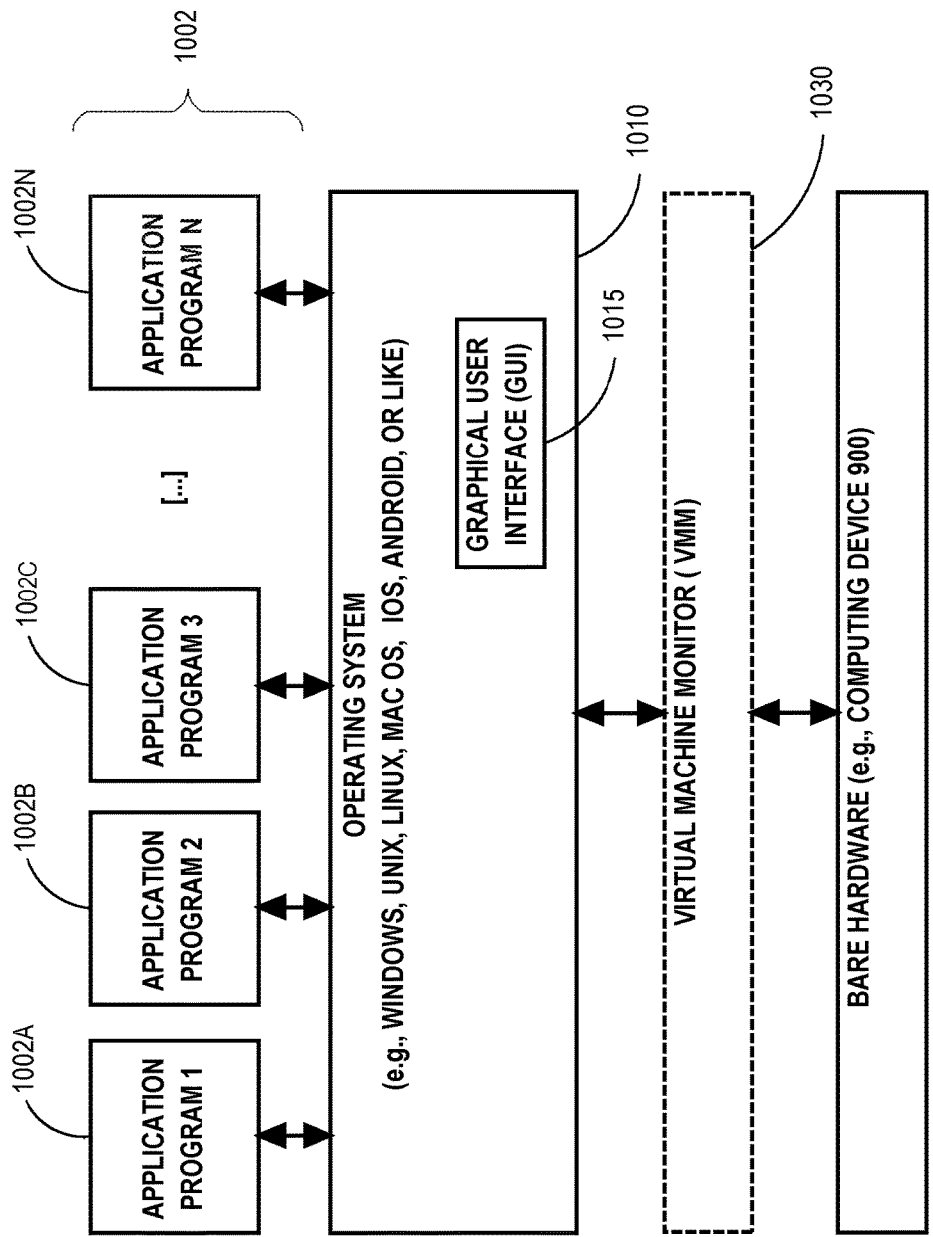
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating a query tree that represents a database query that contains an expression that is represented by a subtree of the query tree;
    generating, from the subtree of the query tree, a sequence of domain specific language (DSL) instructions that represents the subtree;
    executing the sequence of DSL instructions to evaluate the expression during execution of the database query.

2. The method of claim 1 wherein said executing the sequence of DSL instructions comprises:
    first executing, by an initial interpreter, the sequence of DSL instructions to generate a first portion of a result for the database query;
    applying a Futamura projection to generate an optimized interpreter based on the sequence of DSL instructions and the initial interpreter;
    second executing, by said optimized interpreter, the sequence of DSL instructions to generate a second portion of said result for the database query.

3. The method of claim 1 wherein said executing the sequence of DSL instructions comprises:
    generating an initial compilation of the sequence of DSL instructions;
    first executing the initial compilation of the sequence of DSL instructions to generate a first portion of a result for the database query;
    recording dynamic profile data based on said first executing the initial compilation;
    generating an optimized compilation based on the dynamic profile data and the initial compilation;
    second executing said optimized compilation to generate a second portion of said result for the database query.

4. The method of claim 3 wherein said generating the optimized compilation comprises optimizing, based on the dynamic profile data, an abstract syntax tree (AST) that represents said sequence of DSL instructions.

5. The method of claim 4 wherein the AST that represents said sequence of DSL instructions was generated before said recording the dynamic profile data.

6. The method of claim 4 wherein:
    the AST comprises a plurality of syntax nodes;
    said generating the optimized compilation based on the dynamic profile data comprises generating a sequence of machine instructions that interleaves processing of multiple syntax nodes of the plurality of syntax nodes.

7. The method of claim 3 wherein said generating the optimized compilation based on the dynamic profile data comprises at least one selected from the group consisting of:
    implementing a type specialization,
    rewriting an indirect function call,
    speculative inlining of a function,
    operating a polymorphic inline cache, and
    performing branch elimination.

8. The method of claim 7 wherein said implementing the type specialization comprises selecting, for a general datatype, a subtype of the general datatype that consumes less space than the general datatype.

9. The method of claim 8 wherein at least one selected from the group consisting of:
    the general datatype represents a number, and
    the general datatype has a variable width.

10. The method of claim 3 wherein:
said generating the optimized compilation based on the dynamic profile data comprises generating speculative logic;
said second executing said optimized compilation comprises deoptimizing the optimized compilation.

11. The method of claim 1 wherein:
said expression of the database query accesses a plurality of table columns;
said generating the sequence of DSL instructions comprises generating a respective local variable declaration for each table column of the plurality of table columns.

12. The method of claim 1 wherein:
said generating the sequence of DSL instructions comprises generating a tree node that contains the sequence of DSL instructions;
said generating the query tree that represents the database query comprises replacing said subtree of the query tree with said tree node.

13. The method of claim 12 wherein said tree node and said subtree of the query tree comprises a same plurality of leaf nodes.

14. The method of claim 1 wherein:
said expression of the database query accesses a database table column;
said generating the sequence of DSL instructions comprises generating at least one type-specific instruction based on a datatype of the database table column.

15. One or more non-transitory computer-readable media storing instructions that, when executed by one or more processors, cause:
generating a query tree that represents a database query that contains an expression that is represented by a subtree of the query tree;
generating, from the subtree of the query tree, a sequence of domain specific language (DSL) instructions that represents the subtree;
executing the sequence of DSL instructions to evaluate the expression during execution of the database query.

16. The one or more non-transitory computer-readable media of claim 15 wherein said executing the sequence of DSL instructions comprises:
first executing, by an initial interpreter, the sequence of DSL instructions to generate a first portion of a result for the database query;
applying a Futamura projection to generate an optimized interpreter based on the sequence of DSL instructions and the initial interpreter;
second executing, by said optimized interpreter, the sequence of DSL instructions to generate a second portion of said result for the database query.

17. The one or more non-transitory computer-readable media of claim 15 wherein said executing the sequence of DSL instructions comprises:
generating an initial compilation of the sequence of DSL instructions;
first executing the initial compilation of the sequence of DSL instructions to generate a first portion of a result for the database query;
recording dynamic profile data based on said first executing the initial compilation;
generating an optimized compilation based on the dynamic profile data and the initial compilation;
second executing said optimized compilation to generate a second portion of said result for the database query.

18. The one or more non-transitory computer-readable media of claim 15 wherein:
said expression of the database query accesses a plurality of table columns;
said generating the sequence of DSL instructions comprises generating a respective local variable declaration for each table column of the plurality of table columns.

19. The one or more non-transitory computer-readable media of claim 15 wherein:
said generating the sequence of DSL instructions comprises generating a tree node that contains the sequence of DSL instructions;
said generating the query tree that represents the database query comprises replacing said subtree of the query tree with said tree node.

20. The one or more non-transitory computer-readable media of claim 15 wherein:
said expression of the database query accesses a database table column;
said generating the sequence of DSL instructions comprises generating at least one type-specific instruction based on a datatype of the database table column.

* * * * *

UNITED STATES PATENT AND TRADEMARK OFFICE
CERTIFICATE OF CORRECTION

PATENT NO. : 11,461,324 B2
APPLICATION NO. : 16/555974
DATED : October 4, 2022
INVENTOR(S) : Fender et al.

It is certified that error appears in the above-identified patent and that said Letters Patent is hereby corrected as shown below:

On the Title Page

Column 1, under Inventors, Line 3, delete "Saint Ismier (FR)" and insert -- Saint-Ismier (FR) --, therefor.

In the Drawings

On sheet 5 of 10, in FIG. 5, under Reference Numeral 551, Line 1, delete "INIITIAL" and insert -- INITIAL --, therefor.

In the Specification

In Column 8, Line 15, delete "SQL/WL" and insert -- SQL/XML --, therefor.

In Column 12, Line 26, delete "and or" and insert -- and/or --, therefor.

In Column 17, Line 51, delete "section" and insert -- section. --, therefor.

In Column 18, Line 60, delete "MSL IR" and insert -- MSLIR --, therefor.

Signed and Sealed this
Twenty-first Day of March, 2023

Katherine Kelly Vidal
*Director of the United States Patent and Trademark Office*